United States Patent Office 3,692,535
Patented Sept. 19, 1972

3,692,535
PROCESS FOR MAKING A READY-TO-BAKE PIE CRUST
Norrain E. Norsby, Hopkins, and Ernest W. Johnson, Minnetonka, Minn., assignors to General Mills, Inc.
No Drawing. Filed June 1, 1970, Ser. No. 42,521
Int. Cl. A21d *13/08*
U.S. Cl. 99—92                                4 Claims

ABSTRACT OF THE DISCLOSURE

Ready-to-bake pie crust dough which is shelf stable and can be rolled out or otherwise handled without crumbling or breaking. The dough contains, in addition to shortening, flour and water, a fraction of developed wheat gluten.

---

This invention relates to pastry dough which is shelf stable, ready-to-bake and has sufficient strength for ease of handling, shaping, forming and manipulating. More particularly, it relates to ready-to-bake pie crust which is shelf stable without refrigeration and can be rolled or otherwise handled without crumbling or breaking.

Heretofore, pie doughs having sufficiently low moisture content to be microbiologically stable have lacked cohesive and mechanical strength to withstand handling without breaking or crumbling. The ready-to-bake pie crust dough of the present invention is sufficiently strong to permit the same handling as pie dough made from scratch as well as being microbiologically stable. The dough can be packaged in the form of hunks or balls that the consumer rolls out or otherwise shapes before baking. They can also be shaped into sheeted form and packaged in flexible bags. The sheeted dough is then removed from the bag and placed in a pan prior to baking. Both of these packaging and handling techniques require dough that does not crumble or break. The sheeted or rolled out dough can also be packaged in a pie pan. In this instance no actual handling after packaging occurs. Once the ready-to-bake dough is shaped, it is baked in the same manner as a pie crust made from scratch, usually at a temperature of from about 350° F. to 475° F. for a period of from about 8 to 15 minutes.

In general, the dough comprises flour, shortening, water and glycerine, wherein a portion of the flour in the dough is wheat flour containing gluten in a highly developed form. The developed gluten gives the dough the cohesive and mechanical strength to withstand handling without crumbling or breaking. The remainder of the flour is a cereal flour in which the gluten, if any is present, is in a substantially undeveloped form. For the cereal flour fraction containing gluten in a substantially undeveloped form or no gluten at all, wheat flour is preferred if traditional pie crusts are desired. Other cereal flours as corn, oats, rye and mixtures thereof can be used if variations from the traditional pie crust are desired.

The composition of the ready-to-bake pie crust dough of this invention comprises:

About 65 to 80% shortening-cereal flour mix component by weight of the total composition,
About 4 to 20% developed wheat flour dough component by weight of the total composition,
About 0 to 5% water added in addition to water used in the development of the wheat flour dough component, by weight of the total composition, and
About 4 to 12% glycerine by weight of the total composition.

The above ingredients are intimately blended in accordance with the teachings of this invention so that the moisture contributed by the ingredients and added water is uniformly distributed throughout the mixture and the moisture content of the final mixture is from about 10% to 14% by weight of the total composition. Best results are obtained when the above components have been combined in amounts of about 65% to 75% shortening-cereal flour mix component, about 10% to 15% developed wheat flour dough component, about 3% to 4% water and about 5% to 10% glycerine, all by weight of the total composition. Optional ingredients such as salt and pregelatinized starch can be incorporated into the composition as described below. For purposes of inhibiting bacteria, yeast and mold growth, a preservative is preferably included in the composition. A wide variety of preservatives such as potassium sorbate, sodium propionate and sorbic acid are available and can be used. We have found that potassium sorbate in amounts of from about 0.01% to 0.10% by weight of the total composition has successfully inhibited microbiological growth for months.

The composition of the shortening-cereal flour mix component comprises:

About 50% to 70% cereal flour on an as is basis by weight of the shortening-cereal flour dough mix, and
About 30% to 50% shortening by weight of the shortening-cereal flour dough mix.

Included among the cereal flours that can be used are wheat flour, corn flour, rye flour, oat flour and mixtures thereof. The preferred flour for traditional type pie crusts is wheat flour. The shortening used can be either of animal or vegetable origin. Included among the shortenings are plasticized lard, hydrogenated vegetable oils, hydrogenated lard and tallow. Optionally up to about 2.5% salt by weight of the shortening-cereal flour mix composition can be incorporated into the shortening-cereal flour mix. In addition, pregelatinized starch such as pregelatinized corn starch in amounts up to about 10% by weight of the shortening-cereal flour mix can be incorporated into the mix replacing part of the cereal flour. The shortening-cereal flour mix is made by blending the shortening into the flour by conventional means known to the art such as mixing in a ribbon blender.

The composition of the developed wheat flour dough component is comprised of:

About 35% to 60% wheat flour on an as is basis by weight of the developed dough composition,
About 0% to 30% shortening by weight of the developed dough composition, and
About 22% to 40% water by weight of the developed dough composition.

Wheat flour, and preferably all purpose wheat flour, is used in the developed dough component. Optionally, shortenings such as are used in the shortening-cereal flour mix can be used in the developed wheat flour dough component. In addition, salt in amounts up to about 2.5% and pregelatinized starch in amounts up to about 10%, both by weight of the developed dough composition, can be used. One preferred composition of the developed wheat flour comprises about 45 to 48% wheat flour, 20 to 28% shortening and about 22 to 28% water, all by weight of the developed dough component. The amounts of wheat and cereal flour set out are on an as is basis thus including the moisture contained in the flour.

The developed wheat flour dough component can be made according to the following procedure:

(1) The wheat flour and about one half the shortening is added to the water and mixed until there is a slight development of the dough.

(2) The remainder of the shortening is added and mixing is continued until substantially full development of the dough is achieved. The period of mixing to substantially full development varies with different wheat flours, but is usually between about 15 and 25 minutes.

Dough development refers to the degree the protein strands become arranged in a more or less parallel position. When the dough is fully developed, it acquired a smoothness of appearance. At this stage of mixing, the dough exhibits maximum resistance to pull and the greatest degree of elasticity because the greatest number of gluten coils or springs are in a position to resist elongation on the one hand and to straighten back after elongation on the other.

The ready-to-bake pie crust dought is made by combining the shortening-cereal flour mix component and the developed wheat flour dough component and then incorporating glycerine and, if desired, water into the combination. Good results were obtained by the combining of the various components according to the following procedure.

(1) The developed dough was cut into individual pieces preferably about ¾ x ¼ x ⅛ inch.

(2) The individual pieces of the developed dough component were added to the shortening-cereal flour mix component.

(3) Glycerine was added to the mixture of the developed dough component and shortening-cereal flour mix component.

(4) Water was added to adjust the texture.

(5) Optionally part of the initial shortening or additional shortening can be added with the glycerine or water.

(6) The mixture was blended until all of the above ingredients were incorporated into the final dough and the dough was relatively homogeneous. Long, thin strands of gluten contributed by the developed dough component could be seen entwined throughout the final ready-to-bake pie crust dough giving it strength to withstand mechanical handling.

The ready-to-bake dough of this invention has sufficiently low moisture content to inhibit bacteria, mold and yeast growth. The glycerine added also acts to retard the growth of bacteria, mold and yeast as well as contributing to the cohesion of the dough. Additional preservatives such as potassium sorbate, sodium propionate, and sorbic acid, serve to finally microbiologically stabilize the product.

The developed gluten contributed by the developed dough component adds the framework and strength to the ready-to-bake dough to achieve cohesive and mechanical stability. That is, the ready-to-bake dough can be rolled out or otherwise shaped without crumbling or losing its cohesiveness. Without such cohesiveness and strength the ready-to-bake dough could not be marketed in the form of a ball which would later be rolled out to form a crust or in sheet dough configurations packaged in bags. Without the developed dough component, the use of the ready-to-bake pie crust dough is limited to packaging in rigid containers such as pie pans which can support the dough and eliminates the need to shape or otherwise handle the dough.

The preparation of the ready-to-bake pie crust of this invention is illustrated in the following examples.

EXAMPLE I

This example illustrates the preparation and composition of the shortening-cereal flour dough component and the developed wheat flour dough component and the steps and proportions of preparing the ready-to-bake pie crust dough from the components. Two samples are shown below.

Preparation of shortening-cereal flour dough mix

The shortening-cereal flour dough mix component was made by blending the following ingredients in a Hobart Mixer.

| Ingredient | Percent by wt. of the final ready-to-bake pie crust dough | | Percent by wt. of the shortening-cereal flour component | |
|---|---|---|---|---|
| | Sample 1 | Sample 2 | Sample 1 | Sample 2 |
| Wheat flour (all purpose) | 40.75 | 38.11 | 55.85 | 55.85 |
| Plastic shortening* | 29.00 | 27.13 | 39.75 | 39.75 |
| Pregelatinized corn starch | 1.83 | 1.70 | 2.50 | 2.50 |
| Salt | 1.31 | 1.23 | 1.80 | 1.80 |
| Coloring | .07 | .07 | .10 | .10 |
| Total percent shortening-cereal flour component | 72.96 | 68.24 | 100.00 | 100.00 |

* The plastic shortening was a meat fat base shortening containing tallow and lard wherein the lard had been rearranged. The solid fat index o fthe shortening is as follows:

```
        Solid-fat index
Temperature, ° F.                               S.F.I., percent
 50 -------------------------------------------- 29-30
 70 -------------------------------------------- 21-24
 80 -------------------------------------------- 19-22
 92 -------------------------------------------- 14-17
104 -------------------------------------------- 8-10
```

Preparation of developed wheat flour dough

The developed wheat flour dough component was made by mixing the following ingredients in a Hobart Mixer. The wheat flour and half the shortening were blended first. To the blended wheat flour and shortening mixture was added the water, salt and potassium sorbate. This mixture was mixed until slight development of the dough was achieved. The remainder of the shortening was then added and the dough mixed until full development was achieved which required a period of about 15 to 20 minutes on the Hobart Mixer.

| Ingredient | Percent by wt. of the final ready-to-bake pie crust dough | | Precent by wt. of the developed wheat flour dough component | |
|---|---|---|---|---|
| | Sample 1 | Sample 2 | Sample 1 | Sample 2 |
| Wheat flour, all purpose | 7.88 | 7.36 | 50.17 | 50.17 |
| Plastic shortening* | 4.14 | 3.8 | 26.36 | 26.35 |
| Water | 3.45 | 3.22 | 21.94 | 21.94 |
| Salt | 0.22 | 0.20 | 1.41 | 1.42 |
| Potassium sorbate | 0.02 | 0.02 | 0.12 | 0.12 |
| Total percent of developed wheat flour component | 15.71 | 14.67 | 100.00 | 100.00 |

*See previous footnote.

The developed dough was cut into pieces having dimensions of approximately ¾" x ¼" x ⅛".

Preparation of the ready-to-bake pie dough

The pieces of the developed wheat flour dough componet were added to the shortening flour component. The flavourings and preservatives were first dissolved in the water added for texture.

| Components and addition ingredients | Percent by wt. of the final ready-to-bake pie crust dough | |
|---|---|---|
| | Sample 1 | Sample 2 |
| Shortening-cereal flour component | 72.96 | 68.25 |
| Developed wheat flour dough component | 15.71 | 14.68 |
| Glycerine | 7.18 | 9.95 |
| Plastic shortening* | | 3.71 |
| Water | 3.37 | 3.14 |
| Pregelatinized corn starch | .50 | |
| Imitation vanilla | .20 | .20 |
| Potassium sorbate | .07 | .06 |
| Cinnamon | .01 | .01 |
| Total | 100.00 | 100.00 |

*See previous footnote.

The mixture of the components was then blended until the various components were incorporated into a dough.

The ready-to-bake pie crust dough was rolled out and baked at a temperature of 425° F. for a period of 10 minutes. The baked crust was tender and had a flaky typical pie crust texture. The dough was shelf stable at about 75° F. for a period of 6 months.

EXAMPLE II

This example illustrates variations in the amounts of the various components in the ready-to-bake pie dough.

The ready-to-bake pie crust dough was made by the procedure set out in Example I. The shortening-cereal flour mix component had the composition:

| | Percent by weight |
|---|---|
| Wheat flour, all purpose | 55.85 |
| Plastic shortening [1] | 39.75 |
| Pregelatinized corn starch | 2.50 |
| Salt | 1.80 |
| Color | 0.10 |
| | 100.00 |

[1] See footnote to Example I.

The developed wheat flour dough component had the composition:

| | Percent by weight |
|---|---|
| Wheat flour, all purpose | 49.00 |
| Plastic shortening [1] | 25.76 |
| Water | 21.40 |
| Pregelatinized corn starch | 2.46 |
| Flour salt | 1.38 |
| | 100.00 |

[1] See footnote to Example I.

Twelve samples were made having the compositions shown in Table 1. In samples 1, 2, 6 and 7 additional shortening was added at the point in the process that the glycerine was mixed with the shortening-cereal flour component and the developed wheat flour dough component.

The resulting ready-to-bake pie doughs were easily rolled out into pie crusts. After baking at a temperature of about 425° F. for a period of about 10 minutes, the crusts had the flaky texture of good pie crusts.

EXAMPLE III

This example illustrates variations in the developed wheat flour dough component of the ready-to-bake pie crust dough.

Developed wheat flour dough component samples having compositions as follows were developed in a Hobart Mixer. Developed dough component Sample B was made according to the procedure set out in Example I. Developed dough components Samples A and C were made by the same procedure but omitting the two step addition of shortening.

Compositions of component samples

Sample A:

| | Percentage by weight |
|---|---|
| Wheat flour, all purpose | 59.95 |
| Water | 39.93 |
| Potassium sorbate | .12 |
| | 100.00 |

Sample B:

| | |
|---|---|
| Wheat flour, all purpose | 52.13 |
| Water | 21.70 |
| Plastic shortening [1] | 26.05 |
| Potassium sorbate | .12 |
| | 100.00 |

[1] See footnote to Example I.

Sample C:

| | |
|---|---|
| Wheat flour, all purpose | 70.38 |
| Water | 20.43 |
| Glycerine | 9.08 |
| Potassium sorbate | .11 |
| | 100.00 |

The above developed wheat flour dough components were combined with a shortening-cereal flour component having the composition:

| | Percentage by weight |
|---|---|
| Wheat flour, all purpose | 55.85 |
| Plastic shortening [1] | 39.75 |
| Pregelatinized corn starch | 2.50 |
| Salt | 1.80 |
| Color | 0.10 |
| | 100.00 |

[1] See footnote to Example I.

TABLE 1.—READY-TO-BAKE PIE DOUGH COMPOSITIONS
[Percentage by weight based on complete ready-to-mix dough]

| Sample | Shortening cereal flour component | Developed dough component | Shortening | Glycerine | Water | Potassium sorbate | Cinnamon | Imitation vanilla |
|---|---|---|---|---|---|---|---|---|
| 1 | 73.48 | 15.83 | | 7.23 | 3.39 | .07 | | |
| 2 | 68.35 | 14.72 | 3.72 | 9.99 | 3.15 | .07 | | |
| 3 | 69.32 | 14.93 | 5.66 | 6.82 | 3.20 | .07 | | |
| 4 | 78.38 | 8.44 | | 7.72 | 5.07 | .07 | .02 | .30 |
| 5 | 73.24 | 15.78 | | 7.21 | 3.38 | .07 | .02 | .30 |
| 6 | 68.13 | 14.67 | 3.71 | 9.95 | 3.14 | .07 | .02 | .30 |
| 7 | 69.10 | 14.88 | 5.64 | 6.80 | 3.19 | .07 | .02 | .30 |

The combined shortening-cereal flour component and the developed dough component was combined with glycerine and water to produce ready-to-bake pie crust doughs having the compositions shown in Table 2.

The resulting doughs were easily rolled out. After baking at a temperature of about 425° F. for a period of about 10 minutes, the crusts had the flaky texture of good pie crusts.

As can readily be appreciated, the ready-to-bake pie crust dough of this invention combines the shelf stability of low moisture doughs with the strength and elasticity of high moisture doughs.

TABLE 2.—READY-TO-BAKE PIE CRUST DOUGH COMPOSITIONS

| Sample | Developed dough | | | Shortening cereal flour component | Glycerine | Water | Potassium sorbate |
|---|---|---|---|---|---|---|---|
| | Sample A | Sample B | Sample C | | | | |
| 1 | 8.63 | | | 80.19 | 7.90 | 3.21 | .07 |
| 2 | 16.38 | | | 76.06 | 7.49 | | .07 |
| 3 | | 8.47 | | 78.64 | 7.74 | 5.08 | .07 |
| 4 | | 8.86 | | 82.32 | 4.05 | 4.69 | .08 |
| 5 | | 15.83 | | 73.48 | 7.23 | 3.39 | .07 |
| 6 | | 16.50 | | 76.60 | 3.77 | 3.06 | .07 |
| 7 | | | 17.13 | 74.23 | 5.71 | 2.86 | .07 |

We claim:

1. A process for making a ready-to-bake pie crust dough which contains about 10–14% moisture by weight of the total composition which comprises:
   blending cereal flour in which gluten, if any is present, is in a substantially undeveloped form, with plastic shortening in amounts of from about 50% to 70% cereal flour on an as is basis and from about 30% to 50% plastic shortening by weight of the mixture;
   mixing wheat flour, water and optionally plastic shortening in amounts of from about 35% to 60% wheat flour on an as is basis, from about 22% to 40% water and from about 0% to 30% plastic shortening all by weight of the mixture until a dough containing developed gluten is formed;
   combining said plastic shortening-cereal flour mixture with the dough containing developed gluten in amounts of from about 65% to 80% plastic shortening-cereal flour mixture and from about 4% to 20% of the dough containing developed gluten, both by weight of the final ready-to-bake pie crust dough composition; and
   mixing the combination of the plastic shortening-cereal flour mixture and the dough containing developed gluten with glycerine and water in amounts of from about 0% to 5% water and from about 4% to 12% glycerine, both by weight of the final ready-to-bake pie crust dough composition to form the ready-to-bake pie crust dough.

2. The process of claim 1 wherein said cereal flour is wheat flour.

3. The process of claim 1 wherein the shortening-cereal flour mix is used in an amount of about 65 to 75%, the dough containing developed gluten is used in an amount of about 10 to 15%, water is added in an amount of about 3 to 4% and the glycerine is used in an amount of about 7 to 10%.

4. The process of claim 1 wherein a mold inhibitor is included.

References Cited

UNITED STATES PATENTS 3,116,149 12/1963 Luedtke _____ 99—92
3,294,547 12/1966 Kooistra _____ 99—92

RAYMOND N. JONES, Primary Examiner